Oct. 3, 1939.  A. SELSKY  2,174,899
ORNAMENTAL GLASS
Filed Aug. 13, 1938
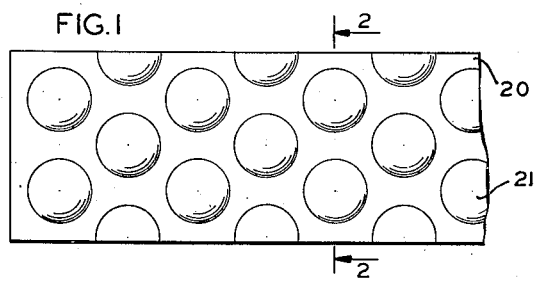 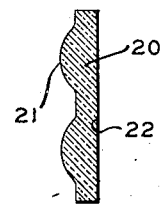
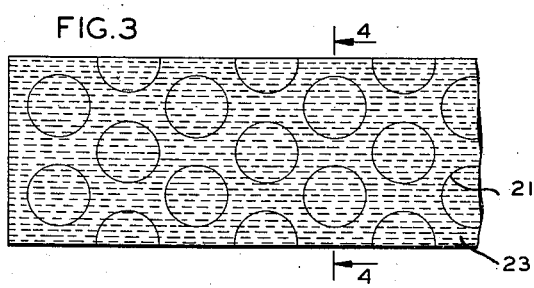 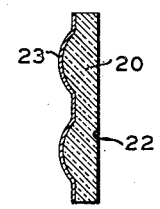
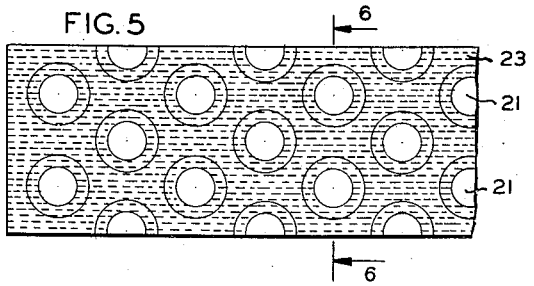 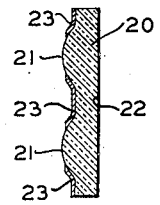 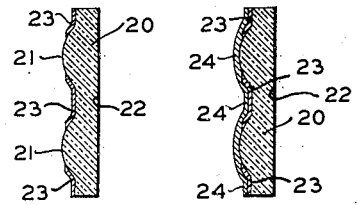
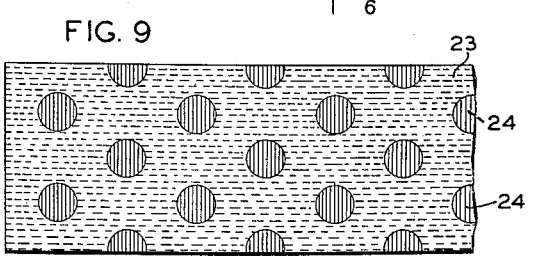 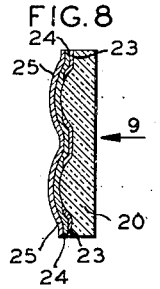 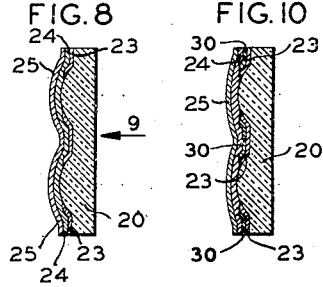
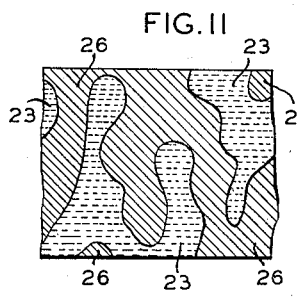 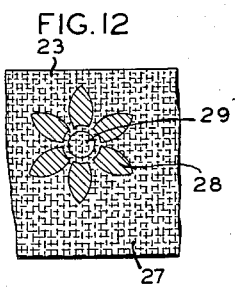
INVENTOR.
Al Selsky
BY Benjamin Webster
ATTORNEY.

Patented Oct. 3, 1939

2,174,899

UNITED STATES PATENT OFFICE 2,174,899

ORNAMENTAL GLASS

Al Selsky, Brooklyn, N. Y.

Application August 13, 1938, Serial No. 224,814

4 Claims. (Cl. 41—38)

The invention relates to ornamental glass to be used as a decorative trimming and the process of making this glass.

Among the objects of the invention are first, to provide an ornamental glass with a large number of beautiful designs which may be varied by changing the mold, by changing the color of the glass itself and by changing the color of a material applied thereto; to use in the aforesaid ornamental glass a low priced molded glass such as that used in the trade for leading, which has the characteristic that it is manufactured substantially of the thickness of ordinary window glass but with one or both surfaces of a roughened or wavy form; to provide a method of manufacturing this novel ornamental glass which is simple and economical.

The method of manufacture in a preferred form comprises the following steps; first, a roughened surface of a molded glass of a desired design is coated with silver as in the manufacture of ordinary mirrors, second, the high spots are brushed to remove the silver therefrom, the size of the brushed-off areas being greater if the pressure on the brush is greater, to leave designs as viewed from the front which are related to the high spots of the rear surface of the glass; third, a shellac of any desired color is applied to the silvered surface to cover the exposed transparencies, which gives a design as viewed from the front that is colored both by the color of the shellac selected and by the color of the glass itself; fourth, the back of the glass is finished by coating it with a rubber paint. In a modification of the method, between the second and third steps, after the high spots are brushed to remove the silver and before the colored shellac is applied to the silvered surface, the latter is copper plated in order to produce a more durable and lasting ornamental glass.

It will be understood that the roughening or forming of high spots in the glass is varied to any desired design by using a suitable mould for forming them when the glass is manufactured.

By selecting the colors of the glass and of the shellac from color charts, it is possible to obtain beautiful effects of any desired color harmony and for harmonizing with any desired woodwork or other piece to be ornamented. The varying curvatures of the surface of the glass provide irregular varying refracting structures which diffuse the light from the silvered surface and from the colored design to give a great variety of attractive light effects.

Referring to the drawing, in which the coatings are magnified:

Figure 1 is a rear view of a plate of molded glass showing circular convex protuberances with the front of the plate plane.

Figure 2 is a section on line 2—2 of Figure 1.

Figure 3 is a rear view after silvering which is still wet.

Figure 4 is a section on line 4—4 of Figure 3.

Figure 5 is a rear view with the silver brushed off to expose the high spots of the protuberances, the silvering being indicated in part.

Figure 6 is a section on the line 6—6 of Figure 5.

Figure 7 is a section similar to Figure 6 but after a coating of red shellac has been applied to the rear surface.

Figure 8 is a similar section after a coating of rubber paint has been applied to the rear surface.

Figure 9 is a front view showing the circular designs in red shellac and the silver mirror indicated in part.

Figure 10 is a view similar to Figure 6 but of a modification in which copper plating is added on the back of the silvering, before the article is finished.

Figure 11 is a front view of a different design having green shellac as a backing.

Figure 12 is a front view, in which the glass is yellow, the petals are green, and the center of the flower is yellow.

In one embodiment of my invention the method of manufacture is as follows: A glass plate 20 is molded to form a plurality of similar circular protuberances 21 in bas-relief having spherical surfaces on one side, the opposite side 22 being plane, as shown in Figures 1 and 2.

Next, the left side is silvered or mirrored with the usual coating 23 to completely cover the surface as shown in Figures 3 and 4.

Then this irregular surface is brushed off while the silvering 23 is still fresh to leave circular transparent high spots 21, the tops of which are in the same plane, as shown in Figures 5 and 6. It is clear that by increasing the pressure in brushing the circular designs are increased in size and vice versa, to the same depth, so that the designs are easily increased or decreased in this manner. In case that irregular shapes are selected the designs themselves would obviously be varied by varying the pressure on the brush. In any case this is a very simple mechanical operation which is easily varied and exactly controlled.

Following, the surface is coated with a colored shellac 24 of red or any desired color, as shown in Figure 7.

As shown in Figure 8, the ornamental glass has been finished with a coating of rubber paint 25.

Referring to Figure 9, circular red designs 24 appear not only reflected thru the glass plate 20 but also refracted to diffuse the light and so give what may be called a "living or vital" quality to the colored design. Light from the mirrored surface 23 is similarly reflected and refracted.

Figure 10 illustrates a modification in which the back of the silvering 23 is covered with a copper-plate 30. This copper-plate 30 is applied in manufacture after the wet silvering 23 has been brushed off to expose the transparent designs 21 in bas-relief, and copper naturally adheres only to the silver, leaving the bas-relief design exposed to directly receive the shellac on the surface 21 of the plate 20.

In Figure 11 a green shellac 26 has been applied to the bas-relief design on the rear giving the effect of a green sea with silvered peninsulas 23 projecting thereinto from the front.

In Figure 12 a yellow glass plate 27 has been used with the usual silver mirror 23 which is yellow-tinted as seen from the front, the design in bas-relief being a flower. A green shellac 28 has been applied to the petals and a yellow shellac 29 to the center of the flower. Variations in color tints and hues are thus obtained.

It is clear that one or both sides of a glass plate 20 may be molded in any desired bas-relief designs, the color of the plate being varied.

Having shown and described my invention it is clear that many variations can be made by those skilled in the art within the spirit and scope of my invention, and therefore I do not limit myself except as in the appended claims.

I claim:

1. A method of preparing an ornamental glass which comprises the following steps, first, moulding a glass plate with one surface having any desired design in bas-relief, second, silvering this surface, third, brushing the high spots of the bas-relief design to remove the silver and produce a design in transparent glass, fourth, applying shellac to cover this side of the glass, fifth, applying a rubber paint entirely covering the back.

2. A method of preparing an ornamental glass which comprises the following steps, first, moulding a glass plate with one surface having any desired design in bas-relief, second, silvering this surface, third, brushing the high spots of the bas-relief design to remove the silver and produce a design in transparent glass, fourth, applying copper plate to the silvered surface, fifth, applying shellac to cover this side of the glass, sixth, applying a rubber paint entirely covering the back.

3. An ornamental glass having one side moulded with predetermined portions thereof in bas-relief, having the tops of the higher parts thereof in the same plane and forming any desired design, parts of the surface covered with silver leaving the higher parts of the bas-relief uncovered with silver, a copper plate covering the silver, shellac covering both the silver and the uncoated high parts of the bas-relief, and a coating of rubber paint.

4. An ornamental glass having one side moulded with predetermined portions thereof in bas-relief, having the tops of the higher parts thereof in the same plane and forming any desired design, parts of the surface covered with silver leaving higher the parts of the bas-relief uncovered with silver, a copper plate covering the silver, shellac covering both the silver and the uncoated high parts of the bas-relief, and a coating of rubber paint, the glass being of one color to produce refracted light of that color and the shellac being of a different color selected to produce a color harmony between the two colors.

AL SELSKY.